United States Patent [19]

Fukai et al.

[11] Patent Number: 4,849,630
[45] Date of Patent: Jul. 18, 1989

[54] CASSETTE AND ERASURE DEVICE FOR STIMULABLE PHOSPHOR SHEET

[75] Inventors: Nobutaka Fukai; Tsutomu Kimura; Terumi Matsuda, all of Kanagawa, Japan

[73] Assignee: Fuji Photo Film Co., Ltd., Kanagawa, Japan

[21] Appl. No.: 183,967

[22] Filed: Apr. 20, 1988

[30] Foreign Application Priority Data

Apr. 20, 1987 [JP] Japan .................. 62-96834
Apr. 20, 1987 [JP] Japan .................. 62-96835
Apr. 20, 1987 [JP] Japan .................. 62-96836
Oct. 20, 1987 [JP] Japan .................. 62-264872

[51] Int. Cl.⁴ .............................................. G03B 42/00
[52] U.S. Cl. ............................... 250/327.2; 250/484.1
[58] Field of Search .............. 250/327.2 H, 327.2 J, 250/484.1 B

[56] References Cited

U.S. PATENT DOCUMENTS

| 4,258,264 | 3/1981 | Kotera et al. | 250/484.1 |
| 4,276,473 | 6/1981 | Kato et al. | 250/327.2 |
| 4,315,318 | 2/1982 | Kato et al. | 382/6 |
| 4,387,428 | 6/1983 | Ishida et al. | 364/413.13 |
| 4,400,619 | 8/1983 | Kotera et al. | 250/327.2 |
| 4,438,333 | 3/1984 | Teraoka et al. | 250/327.2 |
| 4,439,682 | 3/1984 | Matsumoto et al. | 250/327.2 |
| 4,485,304 | 11/1984 | Teraoka et al. | 250/327.2 |
| 4,500,783 | 2/1985 | Kato | 250/327.2 |
| 4,543,480 | 9/1984 | Kato | 250/327.2 |

FOREIGN PATENT DOCUMENTS

| 56-11395 | 2/1981 | Japan | 250/327.2 |
| 60-21043 | 2/1985 | Japan | 378/22 |

*Primary Examiner*—Constantine Hannaher
*Attorney, Agent, or Firm*—Sughrue, Mion, Zinn, Macpeak & Seas

[57] ABSTRACT

A cassette for erasing remnant radiation images on a stimulable phosphor sheet without the necessity of taking out the sheet includes a casing for accommodating the stimulable phosphor sheet and a cover pivotally mounted to the casing so as to be opened or closed. The cassette also includes a light reflecting member for reflecting or diffusing the light introduced from outside the cassette for irradiation on an image recording region of the sheet, or a light transmitting member for transmitting the light introduced from outside the cassette or the light from an inner light source, or a light emitting device mounted at least in register wiht the image recording area of the stimulable phosphor sheet contained in the cassette.

An erasure device for a stimulable phosphor sheet employing the cassette is adapted to erase radiation energies stored in the sheet by irradiating the sheet with an erasure light, and includes a housing, a device provided in the housing for opening the cassette placed at a predetermined position within the housing and accommodating the stimulable phosphor sheet to be erased, and a light source device provided in the housing and adapted for irradiating the erasure light on the stimulable phosphor sheet within the cassette in the opened state. The arrangement is suitably applied to cases wherein the stimulable phosphor sheet is stored without being used for prolonged time, in which cases the sheet may be employed directly since the secondary erasure directly before usage of the sheet is not required.

15 Claims, 13 Drawing Sheets

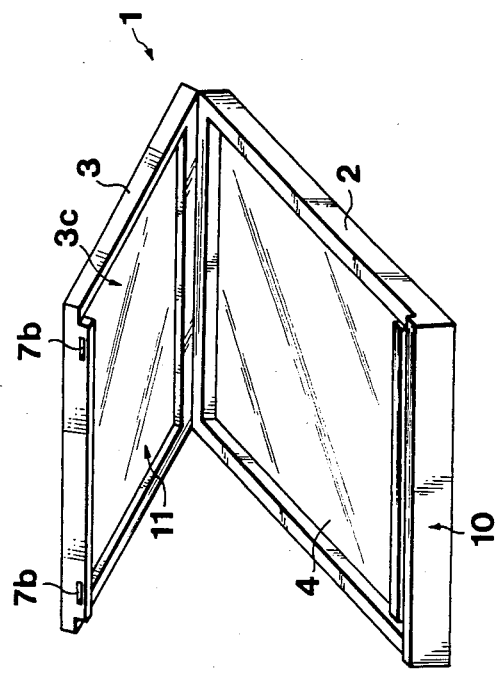
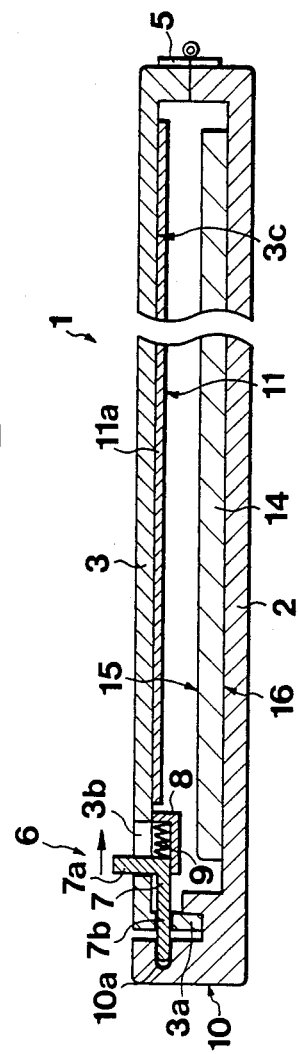
FIG. 1
FIG. 2

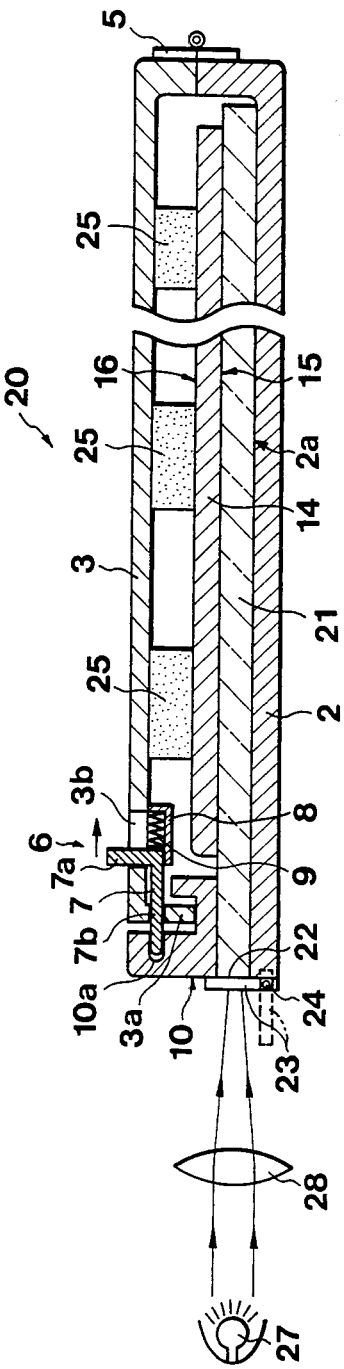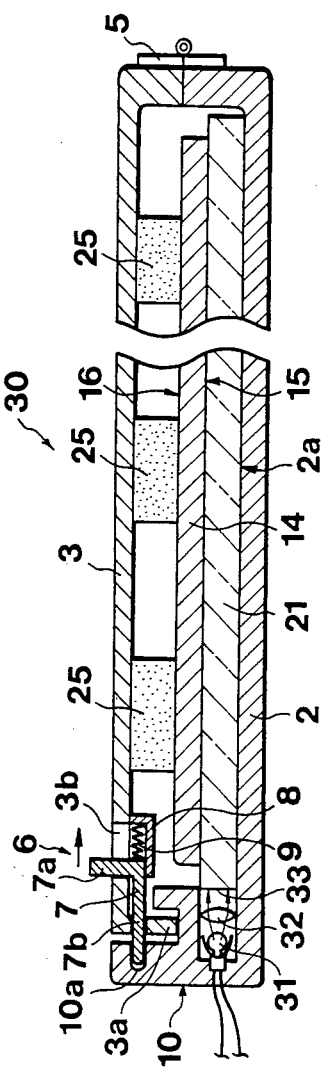

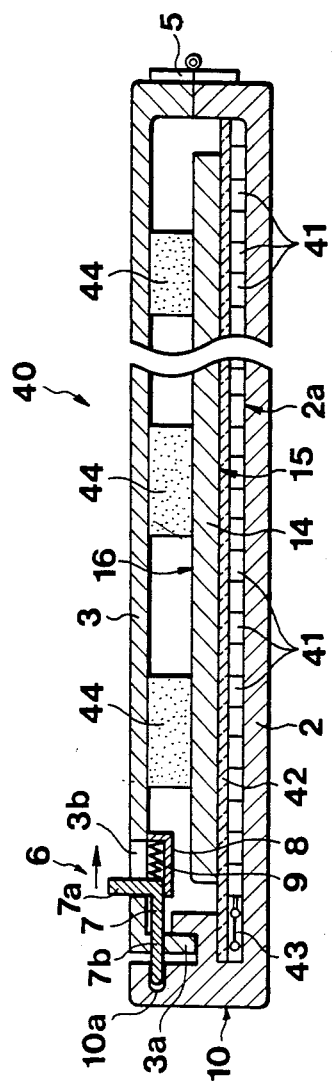
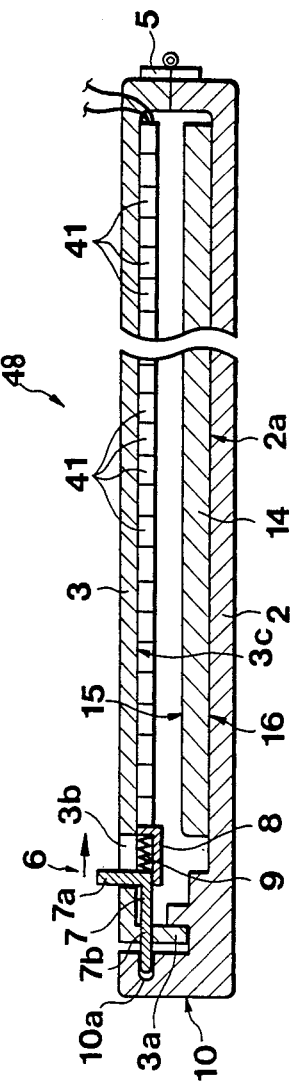

F I G. 18
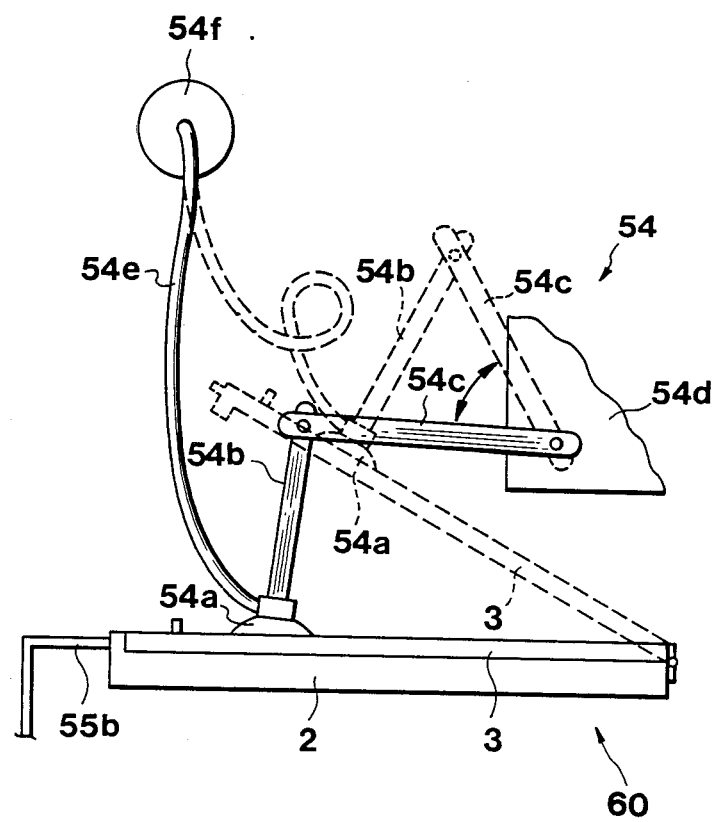

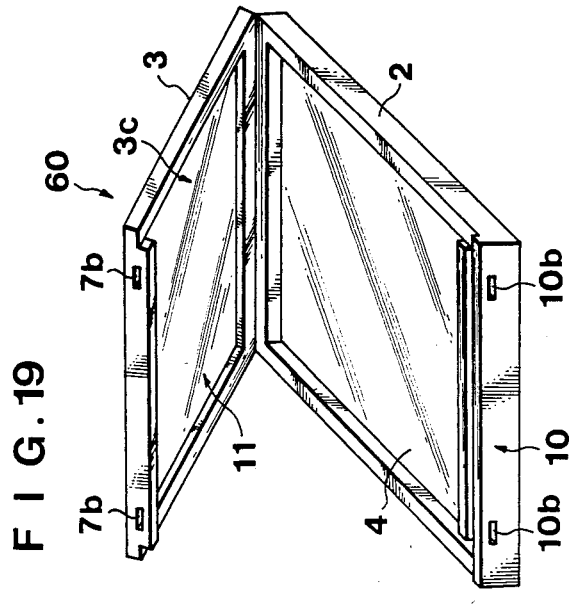
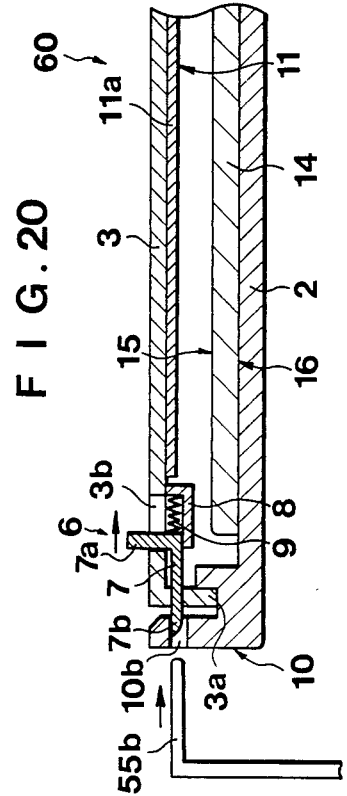

F I G. 21
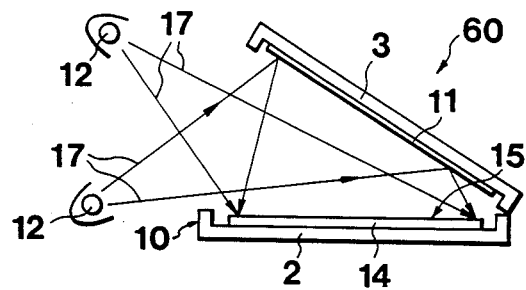
F I G. 22
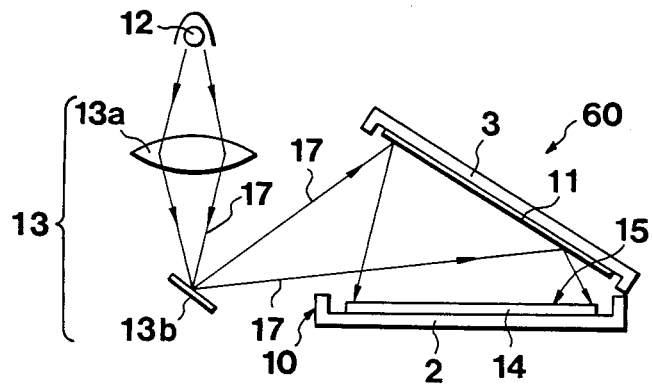
F I G. 23
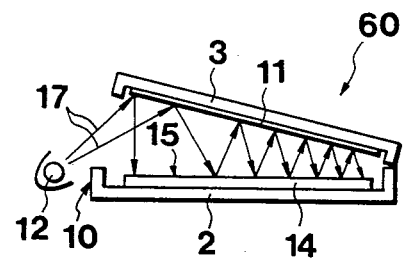

CASSETTE AND ERASURE DEVICE FOR STIMULABLE PHOSPHOR SHEET

BACKGROUND OF THE INVENTION

This invention relates to a container vessel or cassette and an erasure device for a stimulable phosphor sheet. More particularly, it relates to a cassette provided with the function of erasing residual radiation images on the stimulable phosphor sheet and especially that of secondary erasure of erasing useless energies stored in the sheet until the sheet is used for image recording. It also relates to an erasure device for a stimulable phosphor sheet capable of erasing the sheet while contained in the cassette, that is, without the necessity of taking the sheet out of the cassette.

One of typical prior art methods for obtaining radiation images as picture images is a radiation system using a radiation film having an emulsion layer comprising a silver halide photo-sensitive material in combination with a sensitizing paper. As a substitute for the radiation system, attention is recently drawn to a radiation image recording and reproducing system using a stimulable phosphor.

Certain phosphors, when exposed to radiation such as X-rays, $\alpha$-rays, $\beta$-rays, $\gamma$-rays, electron beams and ultraviolet rays, store part of the energy the radiation possesses. When the phosphor is subsequently exposed to a stimulating ray such as visible light, it produces stimulated emission corresponding to the stored energy. The phosphor exhibiting such properties is known as a stimulable phosphor.

There is proposed a system for recording and reproducing radiation image information using the stimulable phosphor. In such a system, the radiation image information of an object such as a human body is first stored in a sheet having a layer of stimulable phosphor (referred to as "stimulable phosphor sheet" or simply "phosphor sheet", hereinafter). The sheet is then scanned with stimulating rays which cause it to emit light in proportion to the radiation energy stored. The emitted light is detected by a photoelectric detector to obtain image signals as electrical signals. The image signals are processed to provide a radiation image of the object ready for diagnosis. Reference is made to U.S. Pat. Nos. 4,258,264, 4,276,473, 4,315,318, and 4,387,428 and Japanese Patent Application Kokai No. 56-11395.

The radiation image information recording/reproducing system includes an image reading unit for reading a radiation image stored in a stimulable phosphor sheet. The following is illustrative of the procedure for the reading unit to read the radiation image.

The stimulable phosphor sheet with the radiation image stored and recorded therein is enclosed in the cassette. The cassette with the phosphor sheet contained therein are loaded into the image reading device. The cassette is then opened and the sheet is taken out of the cassette by leafing means. The sheet is then conveyed as by a conveyor to a reading unit. In the reading unit, the sheet is conveyed in one direction by mechanical means to effect sub-scanning, while the sheet is irradiated with a light beam, such as the laser beam, which is deflected in a direction substantially orthogonal to the sheet conveying direction, to effect main scanning. The light thus produced by stimulated emission is sensed chronologically by a photo sensor such as a photomultiplier to produce an image information. The produced image information is ultimately reproduced as a hard copy or reproduced on a display system such as CRT. The stimulable phosphor sheets from which the image information has been read-out are transported to an erasure device where they are irradiated with an erasure light beam emanating from the light source, such as fluorescent-, tungsten-, halogen-, xenon- or sodium lamp, for erasing residual radiation images, after which they are stacked in a stacker tray.

It will be noted that, after termination of reading and subsequent erasure for releasing the residual radiation energies at the erasure device or section, referred to hereafter as the primary erasure, the stimulable phosphor sheet contained in the stacker tray is exposed to radiation rays such as those emitted from radioactive isotopes contained in minor amounts in the phosphor or intruded into the tray or natural radiations such as electro-magnetic-, cosmic- or diffused X-rays, so that unnecessary energies are stored in the sheet. When the sheet is subsequently employed for recording the image information, these noises are presented as the noise to affect the image information adversely. For this reason, the sheet is subjected again to erasure, referred to hereafter as the secondary erasure, before it is used for signal recording.

Conventionally, the secondary erasure is carried out by any of the following methods.

(i) The stimulable phosphor sheet is transported by a transport device to an erasure unit for primary erasure on the same line as that used for reading. After termination of the secondary erasure at the erasure unit, the sheet is returned into the stacker tray which is then accommodated in the cassette. Reading is not carried out at this time in the erasure unit.

(ii) The stimulable phosphor sheet is taken out of the stacker tray before it is used for signal recording. The sheet is subjected to secondary erasure by a separate erasure unit provided outside of the image reading unit.

(iii) The stimulable phosphor sheet it subjected to secondary erasure unit for secondary erasure which is provided in the vicinity of a loader adapted for introducing the stimulable phosphor sheet from the stacker tray into the cassette.

In the above method (i), the sheet need to be circulated once again on the same line as that used for reading, before it is re-used for signal recording, thus resulting in loss of time. In addition, the device is used exclusively during this time for secondary erasure so that it cannot be used for reading other sheets, thus resulting in the lowered operational efficiency. The cassette needs to be loaded into the device for each secondary erasure with increased labor expenses.

The phosphor sheet is circulated for secondary erasure once on the same transport line as that used for reading, thus resulting in loss of time. In addition, there is the increased likelihood that the surface of the stimulable phosphor sheet is scored during transport to detract from the image quality.

In the methods (ii) and (iii), a separate erasure unit needs to be provided outside of the image reading device or in the vicinity of the loader. In the method (ii), increased time and labor are involved in carrying out the secondary erasure.

In the method (iii), since the secondary erasure is carried out while the stimulable phosphor sheet is introduced for storage into the cassette, secondary erasure needs to be carried out subsequently in cases wherein the sheet is not used directly after it is stored in the cassette but used only after lapse of a prolonged time.

In addition, in the above methods (ii) and (iii), since it is necessary that the stimulable phosphor sheet be taken out of the cassette and returned into the cassette by manual operation after it is subjected to the secondary erasure by the separate erasure device, the sheet is directly touched by hand, so that fingerprints or hand dirts may be adhered to the sheet surface.

SUMMARY OF THE INVENTION

It is a principal object of the present invention to obviate the above deficiencies of the prior art and to provide a cassette for a stimulable phosphor sheet endowed with the function of erasure according to which the time and labor involved in the erasure and above all in the secondary erasure of the sheet may be obviated without the necessity of providing the separate unit dedicated to secondary erasure, and the erasure operation can be positively carried out without relevance to the storage time in the cassette.

It is another object of the present invention to provide an erasure device for a stimulable phosphor sheet according to which the time and labor involved in the erasure and above all in the secondary erasure of the sheet may be eliminated and the erasure operation may be carried out positively without damage or attachment of dirts to the sheet surface.

For accomplishing the above objects, the present inventors conducted eager research, and arrived at the concept of endowing the cassette accommodating the stimulable phosphor sheet with the function of erasure such that the erasure may be carried out directly before photographing.

On the basis of the above finding, the first aspect of the present invention resides in a cassette for a stimulable phosphor sheet comprising a casing accommodating a stimulable phosphor sheet therein and a cover pivotally mounted to the casing for opening and closure, wherein light reflecting means are provided therein for reflecting or diffusing the light introduced from outside the cassette for irradiation on an image recording region of the stimulable phosphor sheet.

In the above first aspect of the present invention, the light reflecting means preferably comprises a light reflecting surface on the inner surface of the cover for reflecting or diffusing the light.

According to the second aspect of the present invention, there is provided a cassette for a stimulable phosphor sheet comprising a casing accommodating the stimulable phosphor sheet and a cover mounted to said casing for opening and closure, wherein light transmitting means are provided therein for transmitting the light introduced from outside the cassette for irradiation on an image recording region of the stimulable phosphor sheet.

In the above second aspect, the light transmitting means are preferably provided therein the register with the image recording region of the stimulable phosphor sheet accommodated in the cassette, the light transmitting means comprising a light transmitting member having an inlet for external light, with light barrier means being provided for intercepting the light otherwise introduced into the inlet for external light.

According to the third aspect of the present invention, there is provided a cassette for a stimulable phosphor sheet comprising a casing accommodating the stimulable phosphor sheet and a cover mounted to the casing for opening and closing, wherein a light source and light transmitting means are provided therein, the light transmitting means transmitting the light from the light source for irradiation on the image recording region on the stimulable phosphor sheet.

In the above third aspect, the light transmitting means include a light transmitting member provided in register with the image recording region of the stimulable phospor sheet and having an inlet for light emitted by the light source.

According to the fourth aspect of the present invention, there is provided a cassette for a stimulable phosphor sheet comprising a casing for the stimulable phosphor sheet and a cover mounted to the casing for opening and closing, wherein light emitting means are provided at least in register with the image recording region of the stimulable phosphor sheet accommodated therein.

In the above fourth aspect, the light emitting means are preferably provided on the inner side of the casing.

In the above fourth aspect, the light emitting means are preferably provided on the inner side of the cover.

In the above fourth aspect, the light emitting means are preferably light emitting diodes.

According to the fifth aspect of the present invention, a device for erasing radiation energies stored in a stimulable phosphor sheet by irradiating an erasure light on the sheet, comprising a housing, means provided in the housing for opening a cassette placed at a predetermined position within said housing, the cassette accommodating the stimulable phosphor sheet to be erased, and a light source device provided in the housing for irradiating the erasure light on the stimulable phosphor sheet within the cassette which is in the opened state.

In the above fifth aspect, cassette transport means are preferably provided for transporting the cassette to the predetermined position in the housing from outside the housing and also out of the housing from the predetermined position.

In the above fifth aspect, only one cassette can be contained in the housing, the one cassette being transported into the device and then transported therefrom after erasure.

In the above fifth aspect, a plurality of cassettes can be contained in the housing and adapted to be erased separately or simultaneously.

The image recording area herein designates the overall surface of the stimulable phosphor sheet when the effective image information is recorded on the sheet surface in its entirety, and a portion of the sheet surface when the effective image information is recorded on such portion, as when the object is placed at the center of the sheet for recording.

BRIEF DESCRIPTION OF THE DRAWINGS

FIG. 1 is a perspective view showing an example of the cassette for a stimulable phosphor sheet according to the present invention.

FIG. 2 is a partially sectioned side elevational view of the cassette shown in FIG. 1.

FIG. 10 is a partially sectioned side elevational view of the cassette shown in FIG. 9.

FIG. 11 is a partially sectioned side elevational view showing an example of the cassette for a stimulable phosphor sheet wherein the light source is enclosed in the cassette.

FIG. 14 is a partly sectioned side elevational view of the cassette shown in FIG. 13.

FIG. 15 is a partly sectioned side elevational view showing an example of the cassette for the stimulable phosphor sheet according to the present invention, wherein the light emitting means is provided on the inner surface of the casing.

FIG. 18 is a side elevational view showing the opening and closing operations of the cassette cover.

FIG. 19 is a perspective view showing an example of a cassette.

FIG. 20 is a partially sectioned side elevational view of the cassette shown in FIG. 19.

FIGS. 21 to 24 are side elevational views diagrammatically illustrating the state of irradiation with the erasure light of the stimulable phosphor sheet contained in the cassette.

FIG. 23 is a sectional view taken along line A—A of FIG. 25.

DETAILED DESCRIPTION OF THE INVENTION

Figure 3:
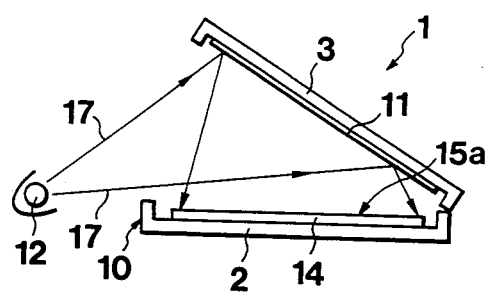
FIGS. 3 to 7 are diagrammatic side elevational views showing the state of erasure of the stimulable phosphor sheet using the cassette according to the present invention.

Referring to the accompanying drawings, preferred illustrative embodiments of the cassette and the erasure device according to the present invention will be explained in detail.

Referring first to FIGS. 1 to 8, a first embodiment of the present invention will be explained.

FIGS. 1 and 2 are a perspective view and a partially sectioned side elevational view, respectively, showing a cassette according to a first embodiment of the present invention.

As shown in these figures, the cassette 1 of the present invention includes a casing 2 having an inner space 4 in which a stimulable phosphor sheet 14 can be stored. A cover 3 is pivotally mounted as by a hinge 5 to one side of the casing 2. The cover 3 may be pivotally movable relative to the casing 2 so as to be opened and closed. Preferably, the stimulable phosphor sheet 14 is adapted to be photo-tight upon closure of the cover 3.

A locking unit 6 is provided for locking the cover in the closed state. As shown for example in FIG. 2, the locking unit 6 is comprised of an L-shaped pawl 7 having a lever section 7a and a pawl section 7b, a guide 8 for sliding the pawl 7 in the fore and aft directions when seen from the front side of the cassette 10, that is, in the left and right directions in FIG. 2, and a spring 9 contained in the guide 8 and adapted for biasing the pawl 7 towards the front side of the cassette 1. The lever section 7a of the pawl 7 is projected through an opening 3c formed on the upper surface of the cover 3, while the pawl section 7b of the pawl is passed through a retaining section 3a of the cover and has its foward end introduced into an inner recess 10a on the front cassette side 10.

The locking unit 6 is so designed and constructed that, when the lever section 7a is thrusted in the direction of the arrow mark in FIG. 2 against the bias of the spring 9, the pawl 7 is slid along the guide 8 so that the foward portion of the pawl section 7b is extricated out of the recess 10a to effect unlocking.

Within the inner space 4 of the cassette 1 is disposed the stimulable phosphor sheet 14 with the reverse side of the sheet 14 contacting the bottom 2a of the casing 2, that is, with the front side 15 of the sheet facing upward.

Figure 8:
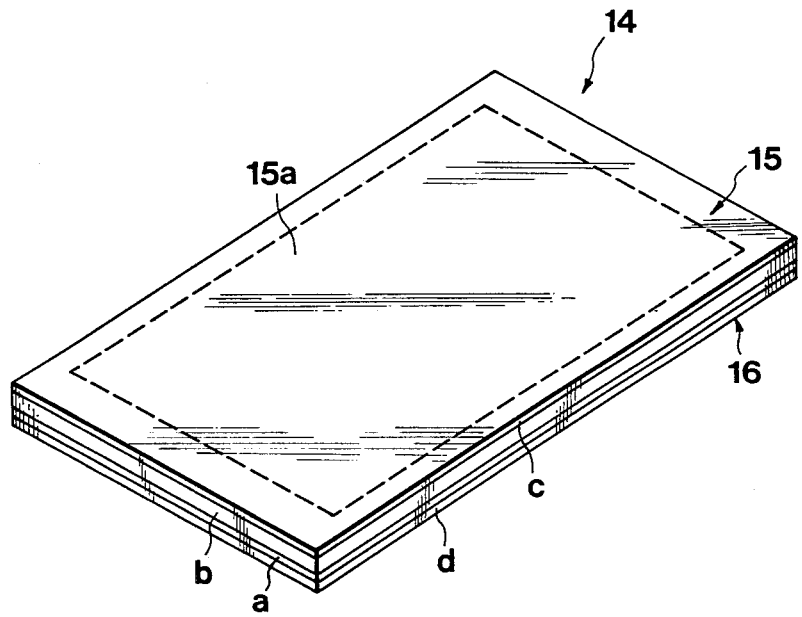
FIG. 8 is a perspective view of the stimulable phosphor sheet.

As showin in FIG. 8, the stimulable phosphor sheet 14 is generally comprised of a support or substrate a, a phosphor layer b provided on the substrate, a protective layer c physically or chemically protecting the surface of the phosphor layer b and a reverse side layer d provided on the reverse side of the substrate a, see for example the Japanese Patent Application KOKAI No. 146477/1980.

The substrate a is formed of paper or organic high polymeric material, such as polyethylene terephthalate, while the phosphor layer b is formed by a binder including an organic high polymeric material, such as nitrocellulose, and stimulable phosphor particles dispersed in the binder. The protective layer c is formed by a coating of polyethylene terephthalate, polyethylene, polyvinylidene chloride, polyamide or a cellulose derivative, while the reverse side layer d is preferably formed of polypropylene.

In the present specification, the sides of the sheet 14 where the protective layer c and the reverse side layer d are provided, are referred to as the front side 15 and the reverse side 16 of the sheet 14, respectively. The portion of the stimulable phosphor sheet 14 where the image information is effectively recorded, that is, the area indicated by a phantom line in FIG. 8, is referred to as an image recording area 15a. This image recording area may cover substantially all or a limited prescribed portion of the stimulable phosphor sheet 14, as discussed hereinabove.

It is a feature of the cassette 1 of the present invention that a light reflective means in provided for reflecting the erasure light introduced from outside of the cassette to the overall image recording area 15a of the stimulable phosphor sheet 1. In effect, a light reflecting surface 11 is formed for regularly reflecting or irregularly reflecting or diffusing the erasure light onto the inner surface 3c of the cover 3, as shown in FIGS. 1 and 2. The cover 3 of the cassette 1 is opened a predetermined angle for introducing the light from a light source 12 provided outside the cassette 1, or the light transmitted through an optical system 13 including a lens, prism or a mirror, this light being reflected or diffused by the light reflecting surface 11 so as to be irradiated on at least the overall image recording area 15a of the phosphor sheet 14.

The light reflecting surface 11 may be formed by any suitable means or methods, as by applying a paint of a higher value color, such as the white color, to a prescribed area of the inner surface 3c of the cover 3, as shown in FIG. 2, for forming a white color coating 11a. Alternatively, a metal foil, such as an aluminium foil, or a resin film of the above color, may be bounded to a prescribed area of the inner surface 3c of the cover 3.

Still alternatively, the white color coating 11a need not be formed intentionally, but the cover 3 itself may be formed of a material presenting the metal color or the white color, with the inner surface 3c thereof spontaneously forming the light reflective surface 11.

The surface 11 need not be formed on the inner surface 3c of the cover in its entirety, but only on a limited portion of the surface 3c.

For example, when the image recording area 15a covers substantially the overall surface of the phosphor sheet 14, the light reflective surface 11 is formed on the inner surface 3c of the cover 3 substantially in its entirety. On the other hand, when the image recording area 15a covers only a prescribed portion of the sheet 14, the light reflective surface may be formed in register with such portion.

The light source 12 emitting the erasure light may include for example a sodium lamp, laser, fluorescent light, halogen lamp or an incandescent lamp.

The cassette according to a first embodiment of the present invention operates in the following manner.

The stimulable phosphor sheet 14 is accommodated in the inside space of the cassette 1 with the front surface 15 thereof facing upward.

When accommodating the sheet 14 within the cassette 1, starting from the state shown in FIG. 2 wherein the cover 3 of the cassette 1 is closed, the lever section 7a of the pawl 7 is thrusted in the direction of the arrow mark in the drawing to extract the forward end of the pawl section 7b out of the recess 10a to release the locking state. Simultaneously, the cover 3 is opened as by sucking and uplifting the cover 3 by a suction plate provided with suction means. The stimulable phosphor sheet 14 is then introduced into the inner space 4 of the cassette 1, after which the suction plate is shifted to close the cover and the locking unit 6 is again set to locking. The above operation may be performed automatically or manually, as desired.

The erasure operation is performed directly before using the stimulable phosphor sheet 14 enclosed in the cassette 1.

The cover 3 of the cassette 1 is first opened a predetermined angle in the manner described above, and the light source 12 is then turned on so that the light emitted therefrom is impinged on the light reflecting surface 11 so as to be reflected or diffused for irradiating the image recording area 15a of the stimulable phosphor sheet 14. The following patterns or modes may be employed for irradiating the image recording area with the erasure light.

In the erasure mode shown in FIG. 3, the light source 12 is placed at a predetermined position outside of the front side 10 of the cassette 1 so that the erasure light 17 emitted from the source 12 is directly impinged on the major portion of the light reflecting surface 11 on the inner side of the cover and thereby reflected so as to be irradiated on the image recording area 15a of the stimulable phosphor sheet 14 in its entirety.

Figure 4:
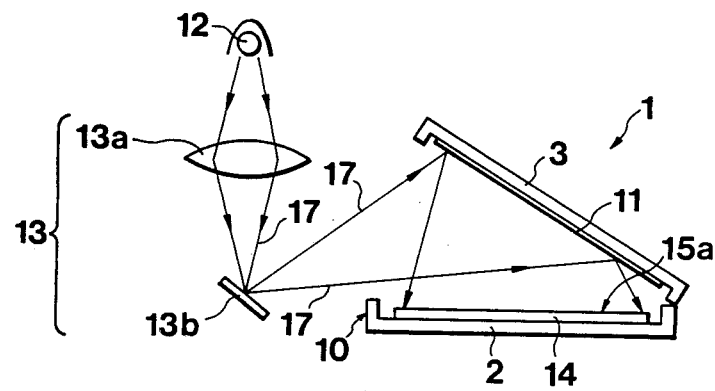

In the erasure mode shown in FIG. 4, the light source 12, lens 13a and the mirror 13b are placed in the predetermined order outside of the front side 10 of the cassette L so that the erasure light 17 emitted from the light source 12 is transmitted through the lens 13a and the mirror 13b and impinged on the major portion of the light reflective inner surface 11 of the cover 3 so as to be reflected thereby and irradiated on the image recording area 15a of the stimulable phosphor sheet 14 in its entirety.

Figure 5:
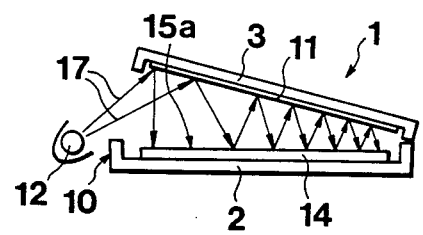

In the erasure mode shown in FIG. 5, the light source 12 is placed at a predetermined position outside of the front side 10 of the cassette 1 to emit the erasure light 17 which is directly impinged on a portion of the light reflecting area 11 on the inner side of the cover 3 so as to be thereby reflected and irradiated on a portion of the image recording area 15a of the stimulable phosphor sheet 14. The image recording area 15a of the phosphor sheet 14, that is, the phosphor layer b, is of a white tint, such that a portion of the irradiated light is reflected and again impinged on the light reflecting surface 11 so as to be returned to the image recording area 15a. The erasure light 17 is reflected repeatedly by the light reflecting surface 11 and the image recording area 15a such that the erasure light 17 is irradiated on the image recording area 15a in its entirety.

Figure 6:
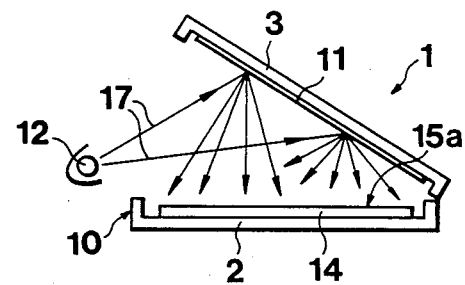

In the erasure mode shown in FIG. 6, the light source 12 is placed at a predetermined position on the front surface 10 of the cassette 1 to emit the erasure light 17 which is directly impinged on the light reflecting surface 11 on the inner surface of the cover 3 so as to be thereby diffused or reflected irregularly. The diffused light is irradiated on the overall image recording area 15a of the stimulable surface 11 is so designed as to cause the reflecting surface 11 is so designed as to cause the incident lights to be diffused or reflected irregularly.

Figure 7:
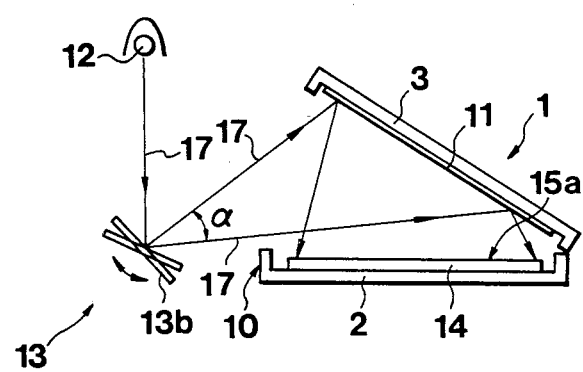

In the erasure mode shown in FIG. 7, the light source 12 and the mirror 13b having a variable angle are provided in a predetermined manner at the front surface 10 of the cassette 1. The light emitted from the light source 12 is reflected by the mirror 13b in a certain direction so as to be impinged on a portion of the light reflecting surface 11 on the inner surface of the cover 3. The light reflected by the surface 11 is irradiated on a portion of the image recording area 15a of the stimulable phosphor sheet 14. The mirror 13b is oscillated to and fro with a moderate period to change the angle of reflection of the erasure light 17 from the light source 12 so that the erasure light 17 is oscillated within an extent of an angle $\alpha$ so as to be irradiated on the overall surface of the image recording area 15a of the stimulable phosphor sheet 14.

It is to be noted that the present invention is by no means limited to the irradiation patterns of the erasure light shown in FIGS. 3 to 7.

The erasure light 17 is irradiated in the above manner on the image recording area 15a of the stimulable phosphor sheet 14 for erasing unnecessary images caused by naturally occurring radiations or light rays.

It is noted that the radiation time of the erasure light may be suitably controlled and determined by the lighting time duration of the light source 12.

After termination of the erasure in the above manner, the stimulable phosphor sheet 14 enclosed within the cassette 1 is ready to be re-used for signal recording.

It is noted that, although the cassette of the present invention is suitable for secondary erasure of the stimulable phosphor sheet 14, it may also be applied for primary erasure, on the condition that the volume of the irradiated erasure light 17 is increased by suitable selection of the light source 12 and/or the irradiation time interval of the erasure light is lengthened. In such case, the erasure section in the reading unit may be advantageously dispensed with to render the reading unit more compact.

In the cassette for the stimulable phosphor sheet of the present invention, since the cassette for accommodating and holding the stimulable phosphor sheet is simultaneously endowed with the erasure function, the following advantages are accrued.

According to the conventional practice of achieving secondary erasure, the stimulable phosphor sheet is transported to a primary erasure unit enclosed in a video or image reading system for erasure as it is circulated on the same line as that for reading, or the sheet is transported to a special erasure unit provided exteriorly of the video reading unit or in the vicinity of a loader adapted for introducing the stimulable phosphor sheet into the cassette. With the cassette of the present invention, it is only necessary that the cover be opened prior to using the stimulable phosphor sheet so that the erasure light is directly irradiated on the sheet previously enclosed in the cassette. Thus there is no necessity for circulating or transporting the phosphor sheet as in the above described conventional system with corresponding savings in time and labor, while there is also no necessity for separately providing the erasure device dedicated to secondary erasure, resulting in a more compact overall system. When the cassette of the present invention is used for primary erasure, there is similarly no necessity for providing an erasure device in the video reading device, resulting further in a more compact overall system.

Also, in accordance with the cassette of the present invention, the cassette cover is opened directly before using the stimulable phosphor sheet to effect primary or secondary erasure, such that, even when the sheet is stored in the cassette for a prolonged time, any noise caused upon exposure to X-rays during the storage period may be erased completely, so that an accurate video information may be obtained upon re-using the stimulable phosphor sheet for video recording.

The second and third embodiments of the present invention shown in FIGS. 9 to 12 will be explained.

In the embodiments shown in FIGS. 9 to 12, parts or components same as those shown in the first embodiment shown in FIGS. 1 to 8 are depicted by the same reference numerals.

Figure 9:
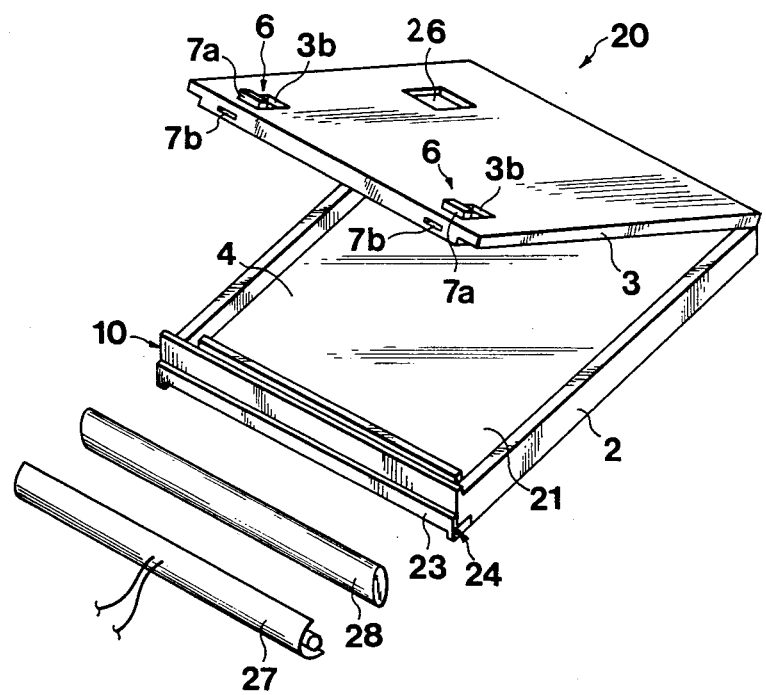
FIG. 9 is a perspective view showing an example of the cassette for the stimulable phosphor sheet according to the present invention, wherein the light source is not contained in the cassette.

FIGS. 9 and 10 are a perspective view and a partially sectioned elevational view, respectively, of the cassette according to the second embodiment of the present invention.

As shown in these figures, the cassette 20 includes a casing 2 having an inner space 4 in which a stimulable phosphor sheet 14 can be stored. A cover 3 is pivotally mounted as by a hinge 5 to one side of the casing 2. The cover 3 may be pivotally turned relative to the casing 2 so as to be opened and closed. Preferably, the phosphor sheet 14 is adapted to be photo-tight upon closure of the cover 3. It is noted that the cover 3 may be opened and closed in any other manner than by pivotal turning.

A locking unit 6 is provided for locking the cover in the closed state. As shown for example in FIGS. 9 and 10, the locking unit 6 is comprised of an L-shaped pawl 7 having a lever section 7a and a pawl section 7b, a guide 8 for sliding the pawl 7 in the fore and aft directions when seen from the front surface 10 of the cassette 10, that is, in the left and right directions in FIG. 10, and a spring 9 contained in the guide 8 and adapted for biasing the pawl 7 towards the front surface 10 of the cassette 20. The lever section 7a of the pawl is projected through an opening 32 formed on the upper surface of the cover 3, while the pawl section 7b of the pawl is passed through a retaining section 3a of the cover and has its foward end introduced into an inner recess 10a on the front cassette surface 10.

The locking unit 6 is so designed and constructed that, when the lever section 7a is thrusted in the direction of the arrow mark in FIG. 10 against the bias of the spring 9, the pawl 7 is slid along the guide 8 so that the foremost part of the pawl section 7b is extricated out of the recess 10a to effect unlocking.

A light transmitting member 21 is provided as the light conveying means on the bottom 2a of the casing 3.

The light transmitting member 21 is in the form of a sheet and has its one side on the front cassette surface 10 emerging out of the surface 10, so that an end face of the sheet forms an inlet for external light 22. Within the inside space 4, the stimulable phosphor sheet 14 is placed so that the surface 15 of the sheet 14 is in contact with the light transmitting member 21. It is noted that a transparent protective plate, not shown, may be interposed between the light transmitting member 21 and the surface 15 of the phosphor sheet 14. Suitable pressers 25 are preferably formed of elastic materials such as rubber, urethane or sponge.

As discussed above by referring to FIG. 8, the stimulable phosphor sheet 14 is generally comprised of a support or substrate a, a phosphor layer b, formed on the substrate, a protective layer c physically or chemically protecting the surface of the phosphor layer b and a reverse side layer d provided on the reverse side of the substrate a, see for example the Japanese Patent Application KOKAI No. 146477/1980.

The substrate a is formed of paper or organic high polymeric material, such as polyethylene terephthalate, while the phosphor layer b is formed by a binder including an organic high polymeric material, such as nitrocellulose, and stimulable phosphor particles dispersed in the binder. The protective layer c is formed by a coating of polyethylene terephthalate, polyethylene, polyvinylidene chloride, polyamide or a cellulose derivative, while the reverse side layer d is preferably formed of polypropylene.

In the present specification, the sides of the sheet 14 where the protective layer c and the reverse side layer d are provided, are referred to as the front side or surface 15 and the reverse side or surface 16 of the sheet 14, respectively. The portion of the stimulable phosphor sheet 14 where the image information is effectively recorded, that is, the area surrounded by an phantom line in FIG. 8, is referred to as an image recording area 15a. This image recording area may cover substantially all or a limited prescribed portion of the stimulable phosphor sheet 14, as discussed above.

The light transmitting member 21 is so arranged that the light may be transmitted therethrough so as to be irradiated on the image recording area 15a of the stimulable phosphor sheet 14. It will be noted that, when the image recording area 15a covers substantially the overall surface of the sheet 14, the light transmitting member is provided on substantially the overall surface of the bottom 2a of the casing 2. On the other hand, when the image recording area 15a covers only a prescribed portion of the sheet 14, the light transmitting member may be provided in register with such portion.

More specifically, the light transmitting member 21 may be formed by a bundle of optical fibers wherein the optical fiber surface facing to the video recording area 15a of the stimulable phosphor sheet 14 is scored so that the light will leak through the scored portions. It will be noted that the light transmitting member 21 is not limited to the above specific structure but may comprise a transparent acrylic resin plate having a score or scores on its surface, or any other structure on the condition that the light may be irradiated on the image recording area 15a of the phosphor sheet 14 in its entirety.

On the front cassette surface 10, a light barrier plate 23 is pivotally mounted by a pin 24 to intercept the light otherwise falling on the inlet of exterior light 22 of the light transmitting member 21. When erasing the stimulable phosphor sheet 14, the plate 23 is opened to a position shown by a phantom line in FIG. 10 so that the light emitted by an exterior light source 27 provided at a prescribed position outside of the cassette and transmitted through an optical system including a cylindrical lens 28 will be introduced through the inlet of external light 22. The barrier plate 23 is otherwise closed to interrupt the light otherwise introduced into the inlet 22. The barrier plate 23 may also be opened and closed during erasure of the phosphor sheet 14 with a timing that will give a desired irradiation time interval, the barrier plate being then used as a shutter.

It is noted that the light barrier plate 23 may also be slid along the front cassette surface 10, instead of being pivotally turned, as described above. Any other light intercepting means than the light barrier plate 23 may also be used for intercepting the light otherwise falling on the inlet of external light 22.

In the cassette 20 according to the second embodiment of the present invention, the external light source 27 is used to effect erasure. The present invention may however be so designed that, as shown in FIG. 11, a light source 31 is provided within the cassette 30 to effect erasure of the stimulable phosphor sheet 14. More specifically, the cassette 30 according to a third embodiment of the present invention is so designed that the inner light source 31 is provided within a recesses portion of the front cassette cover 10 and an optical system including a cylindrical lens 32 is optionally provided in such a manner that the light emitted by the inner light source 31 and further through the cylindrical lens 22 if such is provided will be introduced through a light inlet 33 provided on the front cassette surface of the light transmitting member 21.

Preferably, the external light source 27, the internal light source 31 and the cylindrical lenses 28 and 32 are of the same lengths as the inlet of exterior light 22 or the light inlet 33. The light source and especially the internal light source 31 may be comprised of a linear light source, such as a fluorescent lamp, halogen lamp or a mercury lamp, having approximately the same length as the light inlet 33, or a row of small-sized light source units, such as miniature lamps or LEDs, arranged along the entire length of the light inlet 33.

In the present cassette 20, a window 26 is preferably formed at a prescribed position of the cover 3 for checking a bar code, for example, provided on the reverse surface 16 of the stimulable phosphor sheet 14 enclosed within the cassette 20, as shown in FIG. 9.

In the above described embodiments, the light inlets 22, 33, the light barrier plate 23, the external and the internal light sources 28, 32 are provided on the front cassette surface 10, however, these may also be provided on surfaces or sides other than the front surface 10, such as the rear, left, right, or bottom sides. In other words, the direction along which the erasure light is incident on the cassette is not critical to the present invention. The arrangement may be so made that the erasure light is introduced into the light transmitting member 21 from two or more cassette sides, for example, the front and rear sides or both lateral sides of the cassette.

The cassette of the second and third embodiments of the present invention operates in the following manner.

The stimulable phosphor sheet 14 is accommodated in the inside space 4 of the cassette 20 or 30 with the front surface 15 thereof facing upward.

When accommodating the sheet 14 within the cassette 20 or 30, starting from the state shown in FIG. 10 or 11 wherein the cover 3 of the cassette 20 or 30 is closed, the lever section 7a of the pawl 7 is thrusted in the direction of the arrow mark in the drawing to extract the forward end of the pawl section 7b out of the recess 10a to release the locking state. Simultaneously, the cover 3 is opened as by sucking and uplifting the cover 3 by a suction plate provided with suction means. The stimulable phosphor sheet 14 is then introduced into the inner space 4 of the cassette 20 or 30, after which the suction plate is shifted to close the cover, and the locking unit 6 is again set to locking. The above operation may be performed automatically or manually, as desired.

With the cover 3 in the closed state, the stimulable phosphor sheet 14 is pressed by the elastic pressers 25 so that the sheet 14 is not subjected to positional shift or floating.

The erasure operation is then performed directly before using the stimulable phosphor sheet 14 enclosed in the cassette 20 or 30.

In the case of the cassette 20 shown in FIG. 10 wherein the external light source 27 shown in FIG. 10 is employed for erasure, the light barrier plate 23 is opened and the exterior light source 27 is turned on so that the light emitted therefrom is introduced through the cylindrical lens 28 to the external light inlet 22 of the light transmitting member 21. In the case of the cassette 30 shown in FIG. 11 enclosing the interior light source 21, the interior light source 31 is turned on so that the light emitted therefrom is introduced into the light inlet 33 of the light transmitting member 21.

Figure 12:
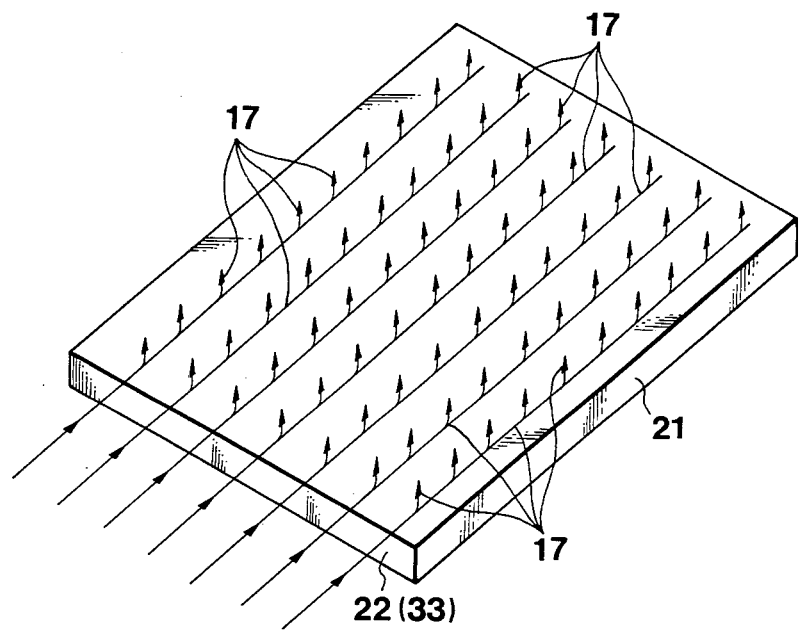
FIG. 12 is a perspective view diagrammatically illustrating the transit of the erasure light through the light transmitting member.

Referring to FIG. 12, the erasure light 17 introduced at the inlet 22 or 33 is transmitted linearly within the light transmitting member 21, while being deviated or dispersed at a number of points towards the front surface 15 of the stimulable phosphor sheet 14 so as to irradiate the surface 15 or the image recording area 15a of the sheet 14 to erase any unnecessary images caused by naturally occurring rays or radiations. The stimulable phoshpor sheet 14 and the light transmitting member 21 are placed so close to each other that the erasure may be accomplished uniformly over the image recording area 15a in its entirety.

The irradiation time duration of the erasure light is controlled or determined by the lighting time of the external light source 27 and the timing of the opening and closure of the light barrier plate 23 used as a shutter, when taken singly or in combination, in the case of the cassette 20 shown in FIG. 10, or by the lighting time duration of the interior light source 31 in the case of the cassette 30 shown in FIG. 11.

After termination of erasure, the stimulable phosphor sheet 14 in the cassette 20 or 30 is ready to be re-used for image recording.

It is noted that, although the cassette of the present invention is suitable for secondary erasure of the stimulable phosphor sheet 14, it may also be applied to primary erasure on the condition that the light volume of the irradiated erasure light 17 is correspondingly increased.

When the cassette is applied to primary erasure, the light source is selected appropriately, while the erasure light is adapted to be introduced into the light transmitting member 21 from two or more directions using plural exterior light sources 27 or internal light sources 31 for increasing the light volume.

In this case, there is advantageously no necessity for providing an erasure section in the reading unit so that the reading unit may be reduced in size.

In the cassette for the stimulable phosphor sheet of the present invention, since the cassette for accommodating and holding the stimulable phosphor sheet is simultaneously endowed with the erasure function, the following advantages are accrued.

According to the conventional practice of achieving the secondary erasure, the stimulable phosphor sheet is transported to a primary erasure unit enclosed in a video reading system for erasure as it is circulated through the same line as that for reading, or the sheet is transported to a special erasure unit provided exteriorly of the video reading unit or in the vicinity of a loader adapted for introducing the stimulable phosphor sheet into the cassette. In the cassette of the present invention, it is only necessary that the cover be opened prior to using the stimulable phosphor sheet so that the erasure light is directly irradiated on the sheet previously accommodated in the cassette. Thus there is no necessity for circulating or transporting the phosphor sheet as in the above described conventional system, with corresponding savings in time and labor, while there is no necessity for separately providing the erasure device dedicated to secondary erasure, resulting in a more compact overall system. When the cassette of the present invention is used for primary erasure, there is similarly no necessity for providing an erasure device in the video reading device, resulting further in a more compact overall system.

Also, in the cassette of the present invention, the cassette cover is opened directly before using the stimulable phosphor sheet to effect primary or secondary erasure, such that, even when the sheet is contained in the cassette for a prolonged time, any noise caused upon exposure to X-rays during such storage period may be erased completely, so that an accurate video or image information may be obtained upon re-using the stimulable phosphor sheet for video recording.

Figure 13:
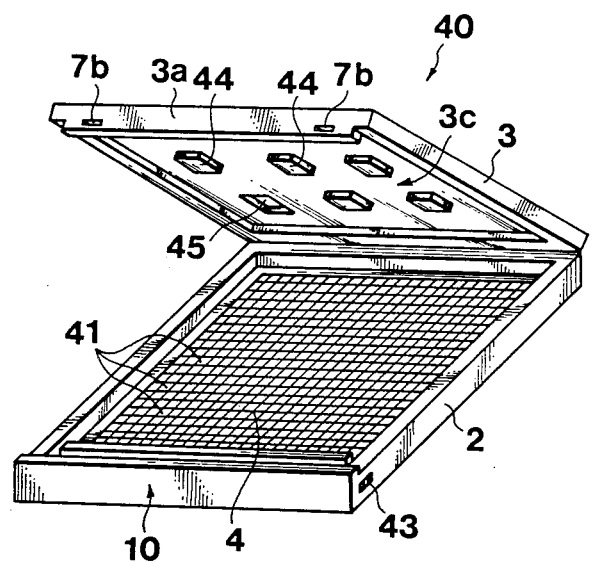
FIG. 13 is a perspective view showing an example of the cassette for a stimulable phosphor sheet according to the present invention, wherein the light emitting means is provided on the inner surface of the casing.

Referring now to FIGS. 13 to 15, the fourth embodiment of the present invention will be explained.

In FIGS. 13 to 15, parts or components same as those of the cassette of the first embodiment shown in FIGS. 1 to 8 are designated by the same reference numerals.

FIGS. 13 and 14 are a perspective view and a partially sectioned elevational view, respectively, of the cassette according to the present fourth embodiment of the present invention.

As shown in these figures, the cassette 40 includes a casing 2 having an inner space 4 in which a stimulable phosphor sheet 14 can be stored. A cover 3 is pivotally mounted as by a hinge 5 to one side of the casing 2. The cover 3 may be pivotally turned relative to the casing 2 so as to be opened and closed. Preferably, the phosphor sheet 14 is adapted to be photo-tight upon closure of the cover 3. It is noted that the cover 3 may be opened and closed in any other manner than by pivotal turning.

A locking unit 6 is provided for locking the cover in the closed state, as shown for example in FIG. 14, the locking unit 6 is comprised of an L-shaped pawl 7 having a lever section 7a and a pawl section 7b, a guide 8 for sliding the pawl 7 in the fore and aft directions when seen from the front side of the cassette 10, that is, in the left and right directions in FIG. 14, and a spring 9 contained in the guide 8 and adapted for biasing the pawl 7 towards the front side of the cassette 40. The lever section 7a of the pawl is projected through an opening 3b formed on the upper surface of the cover 3, while the pawl section 7b of the pawl is passed through a retaining section 3a of the cover and has its forward end introduced into an inner recess 10a on the front cassette surface 10.

The locking unit 6 is so designed and constructed that, when the lever section 7a is thrusted in the direction of the arrow mark in FIG. 14 against the bias of the spring 9, the pawl 7 is slid along the guide 8 so that the foremost part of the pawl section 7b is extricated out of the recess 10a to release the locking state.

Referring to FIGS. 13 and 14, light emitting elements 41 as the light sources are provided on substantially the overall surface of the bottom 2a in the casing 2. Although the light emitting elements 41 may be of any desired type of the condition that these can be used for erasure of the stimulable phoshpor sheet 14, those employing electroluminescence, such as light emitting diodes or LEDs are preferred since these can be conveniently laid in the form of thin sheets on the bottom 2a of the casing 2. Thus it is preferred that a large number of LEDs 41 be densely arranged at prescribed areas on the bottom 2a of the casing 2, as shown in FIG. 13.

These LEDs 41 are preferably supplied with driving currents from an external source and through a terminal 43 provided to the lateral side of the cassette.

It is noted that a transparent protective plate 42 may also be provided on the light emitting elements 41 for protecting the front surface 15 of the stimulable phosphor sheet 14, as shown in FIG. 14.

It is also preferred that suitable pressers 44 be adhered to the inner side 3c of the cover 3 for acting on the stimulable phosphor sheet 14 upon closure of the cover 3 to prevent positional shift or floating of the stimulable phosphor sheet 14. These pressers 44 are preferably formed of elastic materials, such as rubber, urethane or sponge.

In the present cassette 40, a window 45 is preferably formed at a prescribed position of the cover 3 for checking a bar code, for example, provided on the reverse surface 16 of the stimulable phosphor sheet 14 enclosed within the cassette 40, as shown in FIG. 13.

The stimulable phosphor sheet 14 is placed in the present cassette 40 with the front surface 15 of the sheet 14 as later described facing to the side of the casing where the light emitting elements 41 are provided, in such a manner that the front surface 15 of the stimulable phosphor sheet 14 will face to the light emitting elements 41 and the erasure light emitted from the elements 41 will be irradiated at least on the overall image recording surface 15a of the sheet 14 to effect the erasure.

As described above by referring to FIG. 8, the stimulable phosphor sheet 14 is generally comprised of a support or substrate a, a phosphor layer b formed on the substrate, a protective layer c physically or chemically protecting the surface of the phosphor layer b and a reverse side layer d provided on the reverse side of the substrate a, see for example the Japanese Patent Application KOKAI No. 146447/1980.

The substrate a is formed of paper or organic high polymeric material, such as polyethylene terephthalate, while the phosphor layer b is formed by a binder including an organic high polymeric material, such as nitrocellulose, and stimulable phosphor particles dispersed in the binder. The protective layer c is formed by a coating of polyethylene terephthalate, polyethylene, polyvinylidene chloride, polyamide or a cellulose derivative, while the reverse side layer d is preferably formed of polypropylene.

In the present specification, the sides of the sheet 14 where the protective layer c and the reverse side layer d are provided, are referred to as the front side 15 and the reverse side 16 of the sheet 14, respectively. The portion of the stimulable phosphor sheet 14 where the video information is effectively recorded, that is, the area indicated by a phantom line in FIG. 8, is referred to as image recording area 15a. This image recording area may cover substantially all or a limited prescribed portion of the stimulable phosphor sheet 14, as discussed hereinabove.

In the present cassette 40, it suffices that, when the stimulable phosphor sheet 14 is disposed within the cassette, the light emitting elements 41 be disposed for facing to or in register with at least the video recording area 15a of the stimulable phosphor sheet 14.

Thus is suffices that, when the image recording area 15a is provided on substantially the overall surface of the sheet 14, for example, the light emitting elements 41 be arranged on the major portion of the bottom 2a of the casing 2 or the inner surface 3c of the cover and, when the image recording area 15a is provided at a prescribed portion of the sheet 14, the light emitting elements 41 be arranged in register with such portion.

Although the light emitting elements 41 are provided in the above described embodiment on the inner surface or bottom 2a of the casing 2, the elements 41 may also be provided on the inner surface 3c of the cover 3, as shown in FIG. 15. The light emitting elements 41 employed herein may be of the same type as that described hereinabove, and may be arranged in register with at least the video recording area 15a of the enclosed phosphor sheet 14.

The stimulable phosphor sheet 14 is placed in the cassette 18 shown in FIG. 15 with the reverse side 16 of the sheet 14 directing to the bottom 2a of the casing 2, that is, with the front surface 15 directing to the inner surface 3c of the cover 3 provided with the light emitting elements 41.

The present cassette 40 or 48 operates in the following manner.

The stimulable phosphor sheet 14 is enclosed within the inner space 4 of the cassette 40 or 48.

The stimulable phosphor sheet 14 is accommodated within the cassette 40 or 48 shown in FIG. 14 or 15 so that the front surface 15 or the image recording area 15a of the stimulable phosphor sheet 14 will be directed to the side where the light emitting elements 41 are provided.

When accommodating the sheet 14 within the cassette 40 or 48, starting from the state shown in FIG. 14 wherein the cover 3 of the cassette 40 is closed, the lever section 7a of the pawl 7 is thrusted in the direction of the arrow mark in the drawing to extract the forward end of the pawl section 7b out of the recess 10a to release the locking state. Simultaneously, the cover 3 is opened as by sucking and uplifing the cover 3 by a suction plate provided with suction means. The stimulable phosphor sheet 14 is then introduced into the inner space 4 of the cassette 40 or 48, after which the suction plate is shifted to close the cover, and the locking unit 6 is again set to locking.

The above operation may be performed automatically or manually, as desired.

In the cassette 40 shown in FIGS. 13 or 14, the stimulable phosphor sheet 14 is retained at several points by elastic pressers 44 while the cover 3 is closed, so that there is no risk of positional shift or floating of the stimulable phosphor sheet 14.

The erasure operation is performed directly before using the stimulable phosphor sheet 14 enclosed within cassette 40 or 48.

The electrical power is supplied through the terminal 43 to the respective light emitting elements 41 which are thereby turned on. The light emitted from the light emitting elements 41 is irradiated on the overall image recording area 15a of the phosphor sheet 14 for erasing unnecessary images caused by natural rays or radiations. The image recording area 15a of the stimulable phosphor sheet 14 is disposed in a facing relation and in extremely close proximity to the light emitting elements 41, resulting in reliable erasure. Also, with the elements 41 disposed uniformly, erasure may be achieved uniformly on the overall video recording area 15a.

The time interval during which the erasure light is irradiated is suitably controlled and determined by the lighting time interval of the light emitting elements 41.

After termination of erasure in the above described manner, the stimulable phosphor sheet 14 in the cassette 40 or 48 may be again used for signal recording.

It is noted that, although the present cassette 40 or 48 may be advantageously employed to effect secondary erasure of the stimulable phosphor sheet 14, it may also be applied to primary erasure on the condition that the light emitting diodes 41 are properly selected to increase the volume of the irradiated erasure light and/or the irradiation time interval of the erasure light is lengthened. In such cases, there is no necessity for providing an erasure section to the reading unit, so that the reading unit may be advantageously reduced in size.

In the cassette for the stimulable phosphor sheet of the present invention, since the cassette for accommodating and holding the stimulable phosphor sheet is simultaneously endowed with the erasure function, the following advantages are derived.

According to the prior-art practice of achieving secondary erasure, the stimulable phosphor sheet is transported to a primary erasure unit enclosed in an image reading system for erasure as it is circulated on the same line as that for reading, or the sheet is transported to a special erasure unit provided exteriorly of the video reading unit or in the vicinity of a loader adapted for introducing the stimulable phosphor sheet into the cassette. With the cassette of the present invention, it is only necessary that the cover be opened prior to using the stimulable phosphor sheet so that the erasure light is directly irradiated on the sheet previously enclosed in the cassette. Thus the necessity for circulating or transporting the phosphor sheet as in the above described conventional system is obviated with corresponding savings in time and labor, while the necessity for separately providing the erasure device dedicated to secondary erasure is also obviated thus resulting in a more compact overall system. When the cassette of the present invention is used for primary erasure, it is no longer necessary to provide an erasure device in the video reading unit, resulting in a still more compact overall system.

Also, in accordance with the cassette of the present invention, the cassette cover is opened directly before using the stimulable phosphor sheet in order to effect primary and secondary signal erasure, such that, even when the sheet is stored within the cassette for a prolonged time, any noise caused by exposure to X-rays during the storage period may be erased completely, so that an accurate video information may be obtained upon re-using the stimulable phosphor sheet for video recording.

Referring to FIGS. 16 to 30, an erasure device for a stimulable phosphor sheet according to the fifth embodiment of the present invention will be explained.

The present erasure device according to the fifth embodiment employs the cassette according to the first and second aspects of the present invention. In the present embodiment shown in FIGS. 16 to 30, parts or components same as those shown in FIGS. 1 to 8 or in FIGS. 9 to 12 are indicated by the same reference numerals.

Figure 16:
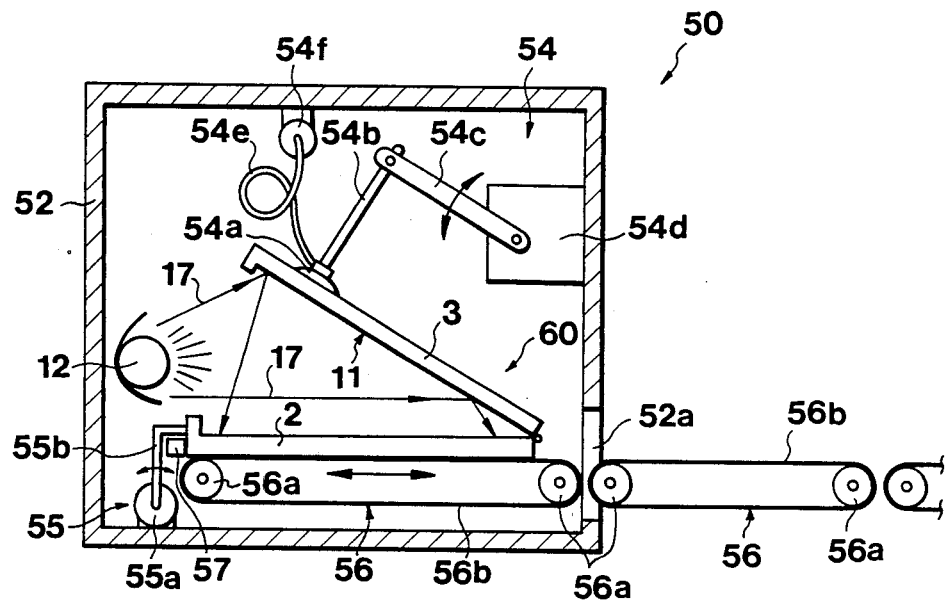
FIG. 16 is a partially sectioned side elevational view diagrammatically illustrating an example of the erasure device for the stimulable phosphor sheet according to the present invention.

FIG. 16 is a partially sectioned side elevational view of an erasure device for a stimulable phosphor sheet according to the present invention. As shown therein, the erasure device 50 for the stimulable phosphor sheet has a housing 52 provided with an opening 52a through which the cassette 60 is introduced into and taken out of of the housing 52. On the bottom of the housing 52, there is provided a belt conveyor 56 as a transport system for transporting the cassette 60 into and out of the casing 52. An endless belt 56b is suspended between rolls 56a, 56a of a belt coveyor 56, these rolls 56a, 56a being revolved in the clockwise or counterclockwise directions for entrance or exit of the cassette 60 into and out of the housing 52. The belt conveyor 56 is also installed outside the housing 52 along the cassette transport channel.

In the vicinity of the terminal end of the belt conveyor 56 within the housing 52, a stop 56 is provided to cause the cassette 60 introduced into the casing 52 to be halted at the prescribed stop position. A sensor, not shown, may be provided to the stop 57 for sensing that it is abutted by the front surface 10 of the cassette 60.

In the erasure device of the present invention, the entrance and exit of the cassette 60 may be made manually instead of automatically by the belt conveyor 56 as described hereinabove. In such case, a cassette holder 62 is preferably provided at the bottom of the housing 52 for holding the cassette at the prescribed position.

A preferred embodiment of the cassette holder 62 and the method of mounting and dismounting the cassette will be explained by referring to FIGS. 25 and 26.

Figure 25:
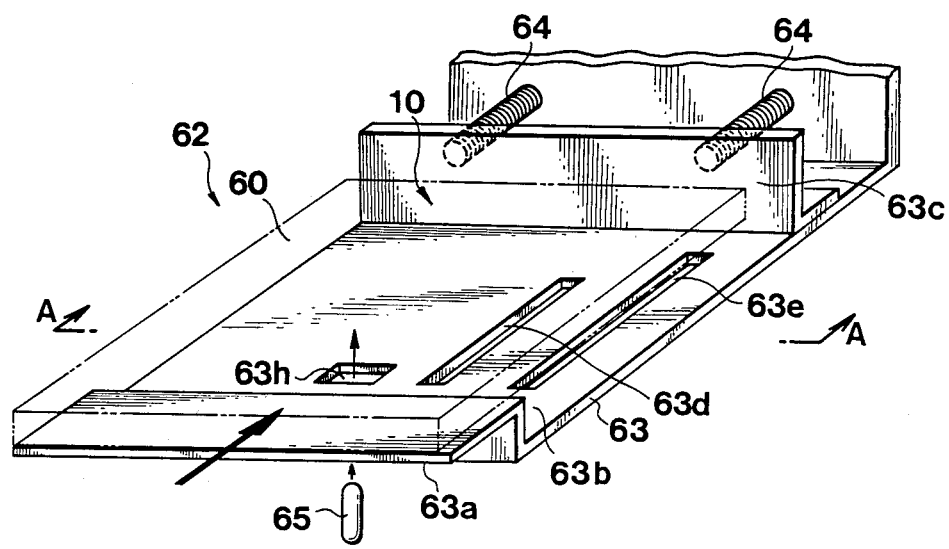
FIG. 25 is a perspective view showing the structure of the cassette holder.
Figure 26:
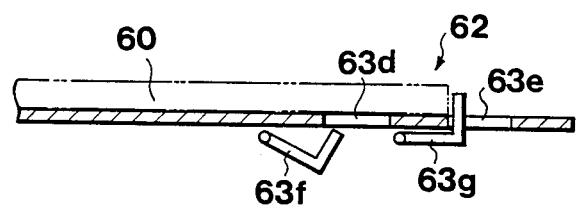

The cassette 60 is introduced manually into the cassette holder 62 along a guide section 63a of a holding block 63 from the front cassette surface 10 along the arrow mark direction shown in FIG. 25. The block 63 is formed with a step or shoulder 63b lower in level than a guide portion 63a. On the step 63b, there is provided a space plate 63c biased by springs 64, 64 in the direction opposite to the inserting direction of the cassette 60 and that is slidable on the step 63b. The cassette 60 is intruded on the block 63 while shifting the space plate 63c in the inserting direction and against the bias of the springs 64, 64. The cassette 60 then descends on the step 63b when the rear end of the cassette in the inserting direction arrives at the step, the cassette then being urged by said space plate 63c so as to be positioned in the inserting direction. In the step 63b, a plurality of slits 63d, 63e are formed along the inserting direction of the cassette 60. Below these slits, positioning plates 63f, 63g are provided so as to be rotated between a first position in which they are projected upward through the slits and a second position in which they are receded below the slits, as indicated by FIG. 26, which is the sectional view along line A—A of FIG. 25. These slits 63d, 63e and the positioning plates 63f, 63g are provided at the positions corresponding to the widths of the cassettes of different sizes likely to be loaded into the cassette holder 62. Depending on the size of the loaded cassette, the prescribed positioning plate is selectively moved to the aforementioned first position for positioning the cassette. When the cassette 60 is positioned two-dimensionally on the step or shoulder 63b, the cassette cover 3 may be opened or closed, while the stimulable phosphor plate 14 contained in the cassette undergoes an erasure.

A through-hole 63h is formed in the vicinity of the guide 63a of the step 63b. After completion of erasure, when the cassette 60 is to be taken out of the cassette holder 62, a pin 65 is introduced into the through-hole 63h to uplift the end of the cassette 60. When the end of the cassette 60 is uplifted to the height of the guide 63a, the cassette 60 is thrusted out of the cassette holder under the urging of the space plate 63c. The cassette may then be taken manually out of the housing 52.

An embodiment of the cassette 60 to which the erasure device 50 of the present invention is applied is hereafter explained.

As the cassette 60, the cassette for a stimulable phosphor sheet according to the first aspect of the present invention shown in FIGS. 1 to 4 is preferred. As shown in FIGS. 19 and 20, the cassette 60 has a casing 2 provided with an internal space 4 for accommodating the stimulable phosphor sheet 14. The cover 3 is pivotally mounted to one side of the casing 2 as by a hinge 5. The cover 3 may be pivotally turned with respect to the casing for opening or closure. The sheet 14 is held photo-tightly upon closure of the cover 3.

A locking device 6 is provided for locking the cover 3 in its closed position. As shown for example in FIG. 20, the locking device 6 is comprised of an L-shaped pawl member 7 formed by a lever section 7a and a pawl section 7b, a guide member 8 for sliding the pawl member 7 in the fore and aft directions when viewed from the front surface 10, or in the left and right directions in FIG. 20, and a spring 9 contained within the guide member 8 and adapted for biasing the pawl member 7 towards the front cassette surface 10. The lever section 7a of the pawl member 7 is protruded towards outside through an opening 3b formed on the upper surface of the cover, while the pawl section 7b of the pawl member is passed through the retaining section 3a of the cover and has its forward end introduced into a through-hole 10b formed in the front surface 10 of the casing 2.

The locking state of the locking device 6 may be released by an unlocking device 55 provided at a predetermined position within the housing 52. The unlocking device 55 includes a driving source 55a such as a rotary solenoid and an L-shaped unlocking pin 55b that is turned by the source 55a. When the unlocking pin 55b is turned clockwise in FIG. 16 upon actuation of the drive source 55a, with the foward end of the pin 55b intruding into the through-hole 10b and thrusting the pawl section 7b against the bias of the spring 9, the pawl member 7 is slid along the guide member 8 in the direction of the arrow mark in the drawing. Thus the foward end of the pawl section 7b is shifted out of the through-hole 10b to release the locking state, as shown in FIG. 20.

Within the inner space 4 of the cassette 60, there is accommodated a stimulable phosphor sheet 14, with the reverse side 16 of the sheet 14 contacting the bottom 2a of the casing 2, that is, with the front surface 15 of the sheet facing upwards.

On all or prescribed portions of the inner surface 3c of the cover 3 of the cassette 60, there is formed a light reflecting surface 11 whereby the erasure light 17 emitted from a light source 12 as later described may be subjected to reflection or diffusion, that is, irregular reflection. That is, as shown in FIG. 16, when the cover 3 is opened a predetermined angle, the light emitted from the light source 12 is reflected or diffused on the light reflecting surface 11 so as to be irradiated on the major portion of the stimulable phosphor sheet 14.

The light reflecting surface 11 may be obtained by applying a light reflective paint, such as the white paint, on a prescribed region or regions of the inner surface 3c of the cover 3 for forming a white coating 11a. Alternatively, a light reflective film, such as a metal foil, above all, an aluminium foil, may be bonded to a prescribed region or regions on the inner surface of the cover 3.

Instead of forming the white coating 11a on the cover 3, the cover itself may be formed of a light reflective metal, with the inner surface 3c of the cover being then used as the light reflecting surface 11.

The structure of the cassette 60 is not to be limited to the above described embodiment. Above all, if the stimulable phosphor sheet 14 can be directly irradiated in its entirety with the erasure light 17 from the light source 12, the light reflective surface 11 may be dispensed with.

As shown in FIG. 16, the light source 12 is provided at a predetermined position within the housing 52. The light source 12 is positioned so that, with the cover 3 of the cassette 60 opened a predetermined angle, the sheet 14 may be irradiated in its entirety by the erasure light 17 after reflection or diffusion by the light reflecting surface 11 on the inner surface 3c of the cover.

An adjustment system may also be provided for adjusting the mounting position of the light source 12.

One or more light sources 12 may be employed as desired. Also the light source may be provided on one or both lateral sides of the cassettes instead of or in addition to the front cassette side.

The light source 12 may be of any type that can emit the erasure light, such as the sodium-, fluorescent-, mercury- or incandescent lamp, an LED array or an electroluminescence panel.

In addition to the light source 12, an optical system, such as the lens, prism or the mirror, may be optionally provided for guiding the erasure light emitted by the light source 61 towards the stimulable phosphor sheet 14. Thus, in the present specification, the term "a light source device" may include the light source 12 alone or in combination with the aforementioned optical system.

The erasure device of the present invention includes a cover opening and closing device 54 adapted for opening and closing cover 3 of the cassette 60. The device 54 includes a first arm 54b to the distal end of which is attached a suction cup 54a, a second arm 54c pivotally connected to the proximal end of the first arm, a drive system 54d for turning the second arm, and a suction system for applying a force of suction to the cup 54a including a suction pump 54f and a resilient tube 54e interconnecting the pump and the suction cup 54a. With the cover 3 of the cassette 60 closed as shown in FIG. 18, the second arm 54c is turned so that the suction cup 54a is brought into mechanical contact with the cover. Then, on actuation of the suction pump 54f, the inner space of the suction cup 54a is evacuated for applying the force of suction to the suction cup 54a for sucking the cover. The locking state of the locking device 6 is then released by actuation of the locking device 6 and the drive system 54d is actuated for turning the second arm 54c clockwise in the drawing, the cover 3 sucked by the suction cup 54a being then uplifted and opened as indicated by the phantom line in FIG. 18.

When it is desired to close the cover 3, the drive system 54d is actuated while the cover 3 remains affixed by suction to the suction cup 54a, so that the second arm 54c is turned back counteclockwise to a position in which the cover can be locked again by the locking system. The suction pump 54f is then turned to reduce the force of suction of the suction cup 54a to nil, so that the suction cup may now be disengaged from the cover 3.

It is noted that the cover opening device need not be necessarily formed by the cover opening and closing device 54 and the unlocking system 55 but may be of any desired construction insofar as opening and closing of the cover 3 of the cassette 60 may thereby achieved.

The erasure device for the stimulable phosphor sheet of the present invention operates in the following manner.

Referring to FIG. 16, the cassette 60 containing the stimulable phosphor sheet 14 is transported along a predetermined route by a belt conveyor 56 provided outside the housing 52 and is introduced into the casing 2 by a belt conveyor 56 provided in the housing 52. When the front surface 10 of the cassette 60 abuts on the stop 57, this is sensed by a sensor, not shown, and the belt conveyor 56 within the housing 52 is halted on the basis of the corresponding information or signals of holding the cassette 60 at the present position.

Then, as shown in FIG. 18, the second arm 54c is turned counteclockwise upon the actuation of the driving system 54d for bringing the suction cup 54a into mechanical contact with the cover 3. The suction pump 54f is then actuated for evacuating the inside of the suction board 54a through a tube 54e for applying a force of suction to the suction cup 54a to attract the cover 3. Thus the state shown by the solid line in FIG. 18 is reached.

On the other hand, the rotary solenoid as the drive source 55a is actuated for turning the unlocking pin 55b counterclockwise to introduce the end of the pin 55b into the through-hole 10b in the front side 10 of the cassette to thrust the pawl section 7b against the bias of the spring 9. This causes the pawl member 7 to be slid along the guide member 8 in the arrow mark direction in the drawing, the end of the pawl member 7b then disengaging from the through-hole 10b to release the locking.

The drive system 54d is then actuated to turn the second arm 54c clockwise to uplift and open the cover 3 a predetermined angle, while the cover 3 is attracted to the suction cup 54a. Thus the state shown by phantom lines in FIG. 18 is reached.

It is noted that, when the unlocking pin 55b remains inserted in the through-hole 10b in the course of the opening and closure of the cover 3, it is possible to prevent the floating or shifting of the cassette otherwise caused when the cover 3 is uplifted by the suction cup 54a.

With the cover 3 kept in its opened state, the light source 12 is illuminated for a predetermined time interval for erasing the stimulable phosphor sheet 14.

The erasure light 17 emitted from the light source 12 falls on the reflecting surface 11 on the inside surface 3c so as to be reflected or diffused thereat to be irradiated on the stimulable phosphor sheet 14.

In irradiating the erasure light, the following systems or patterns may be adopted in addition to that shown in FIG. 16.

Referring to FIG. 21, two light sources 21, 21 are provided at an upper position and a lower position in front of the front cassetter surface 10. The erasure light 17 emitted from the upper light source 12 is directly irradiated on the stimulable phosphor sheet 14, while the erasure light 17 emitted from the lower light source 12 falls on the major portion of the reflecting surface 11 on the inner surface of the cover 3 so as to be reflected thereat to be then irradiated on the stimulable phosphor sheet 14.

Referring to FIG. 22, a light source 22, lens 13a and a mirror 13b are placed in front of the front side 10 of the cassette each that the erasure light 17 emitted from the light source 12 falls on the major portion of the light reflecting surface 11 on the inside of the cover 3 via lens 13a and mirror 13b so to be reflected thereat to be then irradiated on the stimulable phosphor sheet 14.

Referring to FIG. 23, a light source 12 is placed at a predetermined position in front of the front side 10 of the cassette, such that the erasure light 17 emitted by the light source 12 falls on a portion of the light reflecting surface 11 on the inner surface of the cover so as to be reflected thereat to be irradiated on a portion of the stimulable phosphor sheet 14. In general, the surface of the stimulable phosphor sheet 14 has the light reflective property, the irradiated light is partially reflected so as to impinge on the light reflecting surface 11 to be then returned to the sheet 14. In this manner, the erasure light 17 is repeatedly reflected between the light reflecting surface 11 and the stimulable phosphor sheet 14 so that the surface of the sheet 14 is irradiated in its entirety with the erasure light 17.

Figure 24:
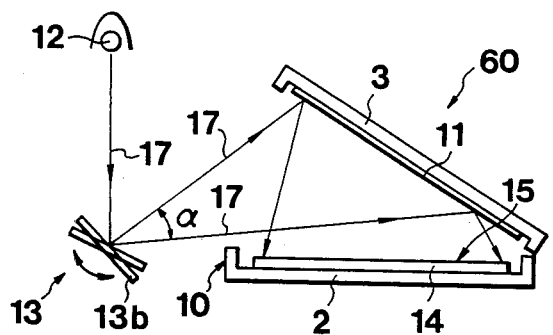

Referring to FIG. 24, a light source 12 and a mirror 13b with a variable angle are placed at a predetermined position in front of the front cassette surface 10. The erasure light 17 emitted by the light source 12 is reflected by the mirror 13b in a predetermined manner to fall on a position of the light reflecting surface 11 on the inner cover surface so as to be reflected thereat and irradiated on a portion of the stimulable phosphor sheet 14. The mirror 13b is reciprocatingly turned at a suitable period to change the angle of reflection of the erasure light 17 such that the erasure light is oscillated over an angle $\alpha$ so as to be irradiated the surface 15 of the sheet 14 in its entirety.

It is to be noted that the present invention is not limited to the irradiation systems or patterns of the erasure light shown in FIGS. 16 and 21 to 24.

The erasure light 17 is irradiated on the stimulable phosphor sheet 14 in the above described manner for erasing the unnecessary energies resulting from environmental radiations.

The volume of irradiation of the erasure light may be suitably adjusted and determined by the lighting time interval of the light source 12.

After the erasure of the stimulable phosphor sheet 14 is completed, the driving system 54d is again actuated to turn the second arm 54c counterclockwise in the drawing to lower the cover 3 attracted by the suction cup 54a to its closure position. Since the pawl section 7b of the pawl member 7 is formed with an inclined surface, the pawl member 7 is automatically slid upon closure of the cover 3 so that the pawl section 7b is again introduced into the through-hole 10b for locking. At this time, the unlocking pin 55b is disengaged from the through-hole 10b.

After the cover 3 is closed and the locking state achieved, the operation of the suction pump 54 is terminated to reduce the force of suction of the suction cup 54a to nil, at the same time that the second arm is turned clockwise in the drawing by the actuation of the drive system 54d to shift the suction cup 54a away from the cover 3. The cover opening and closing device 54 is then in the state of standstill until the cover of the next cassette is opened.

The belt conveyor 56 provided in the casing 52 is then actuated in a direction opposite to that when introducing the cassette 60 for transporting the cassette resting on the belt 56 out of the housing 52. The cassette 60 is transported along a predetermined route by the belt conveyor 56 provided outside of the housing so that the erased sheet 14 contained in the cassette 60 may be again used for recording.

By the repetition of the above sequence of operations, the stimulable phosphor sheets 14 in the cassettes 60 may be erased in succession.

Figure 17:
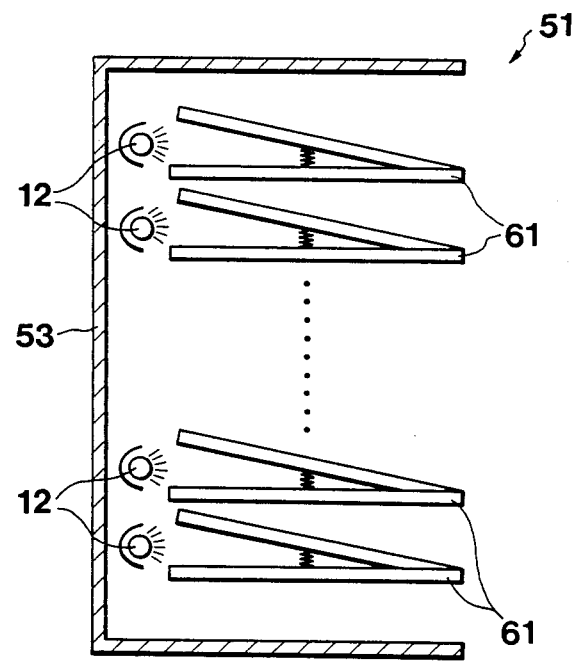
FIG. 17 is a partially sectioned side elevational view diagrammatically illustrating another example of the erasure device for the stimulable phosphor sheet according to the present invention.

In the above described embodiments of the erasure device, only one cassette 60 can be contained in the housing, such that the cassette 60 is transported into the casing and transported therefrom under the erasure is terminated. However, as shown in FIG. 17, plural cassettes may be contained within the casing and the respective cassettes may be erased separately or simultaneously. As shown diagrammatically in FIG. 17, the housing 53 of the erasure device 51 for erasing the stimulable phosphor sheet is adapted for accommodating plural cassettes in tiers. In this case, light sources 12 are provided within the casing 53 for facing to the respective cassettes 61 in the housing 53.

The details of the erasure device 51 adapted for containing the cassettes in tiers and the operation will be explained.

Figure 27:
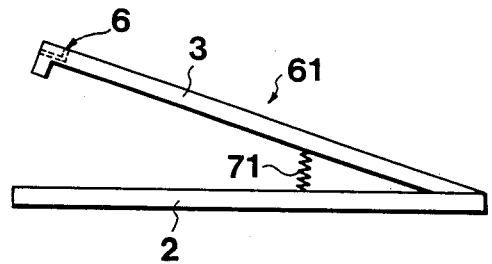
FIG. 27 is a side elevational view of another example of the cassette.

The cassette 61 applied to the erasure device 51 is substantially the same as the cassettes already described with reference to FIGS. 19 and 20 but differs therefrom in that a cover opening spring 71 is provided between the casing 2 and the cover 3 for biasing the cover 3 in its opening direction (FIG. 27).

Figure 28:
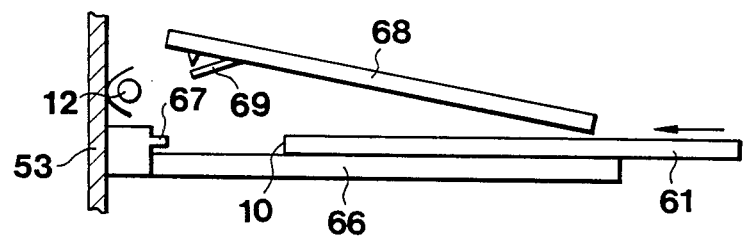
FIGS. 28 to 30 are partial side elevational views diagrammatically illustrating the operation of the erasure device for the stimulable phosphor sheet shown in FIG. 17.

Referring to FIG. 28, showing the one tier section within the housing 53, there is provided in the housing 53 a guide plate 66 for guiding the cassette into its predetermined position. In the vicinity of the innermost portion of the guide plate 66, shown towards left in the drawing, an unlocking pin 67 is provided for unlocking the locking device 6 of the cassette 61. On top of the guide plate 66, there is provided a cover opening angle control plate 68 at a predetermined inclination with respect to the guide plate 66. The inner surface of the control plate 68 is provided with a cover opening detecting switch 69. The cover 3 is closed and the cassette 61 which is in the state it is locked by the locking device 6 is manually introduced along the guide plate 66 in the arrow mark direction in the drawing from the front surface 10 of the cassette 61, until the front cassette surface 10 reaches the innermost portion. At this time, the unlocking pin 67 is intruded into the through-hole 10b in the front side 10 to thrust the pawl section 7b against the bias of the spring 9 for disengaging the foremost part of the pawl section 7b of the through-hole 10b to release locking.

Figure 29:
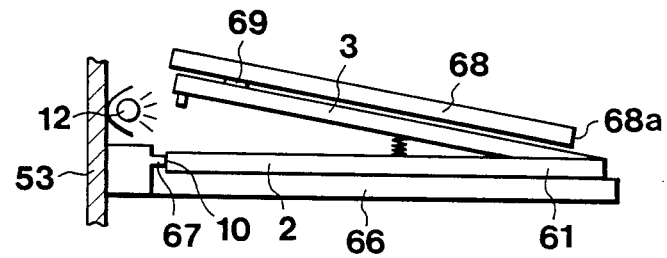
Figure 30:
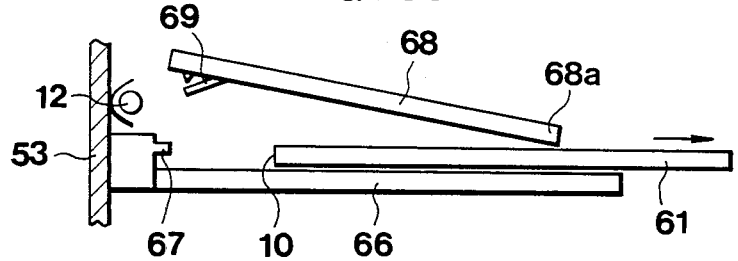

When the locking is released, the cassette cover 3 is opened by the operation of the cover opening spring 71, as shown in FIG. 29. The cover 3 then abuts on the control plate 68 to control the opening angle. Simultaneously, the cover 3 contacts the cover opening detecting switch 69 to turn on the switch. The switch 69 is connected to the light source 12, such that, when the switch 69 is turned on, the light source 12 is illuminated.

After the light source is illuminated for a predetermined time and the erasure of the stimulable phosphor sheet 14 in the cassette 61 is terminated, the cassette 61 is manually shifted in the arrow mark direction so as to be taken out of the housing 53.

Upon extraction of the cassette 61, the cover 3 in the opened state is thrusted down so as to be closed and again locked when the cassette 61 is passing through a space between the guide plate 66 and the rear end 68a of the control plate 68.

Also, as the cover 3 is closed and disengaged, the switch 69 is turned off so that the light source 12 is extinguished.

The above described arrangement is adopted for each tier in the housing 53.

The multi-tier type erasure device 51 may be used simultaneously for storage of the cassettes and erasure of the stimmulable phosphor sheets contained in the cassettes.

It will be noted that the erasure device 51 may be so designed that the erasure operation is performed at all times during storage of the cassettes in the housing or alternately the cassettes are previously stored in the respective tiers in the casing and opened for erasure of the phosphor sheets contained therein directly before the sheets are used for recording.

In the former case, the phosphor sheets in the cassette are stored in the state in which the secondary erasure is terminated, that is, in the state in which the sheets may be directly used for recording. In the latter case, the saving in energy is achieved since it is only necessary that the erasure light in an amount corresponding to the storage time may be irradiated directly before the sheets are used and the irradiation time duration of the erasure light may be adjusted by the output of the light source.

The erasure device of the present invention may be suitably applied to the secondary erasure of the stimulable phosphor sheet or sheets in the cassettes 60 or 61. However, it may be also applied to primary erasure on the condition that the light volume of the erasure light 17 is increased by proper selection of the kinds or the number of the light sources 12 and/or the irradiation time interval of the erasure light 17.

According to the erasure device for the stimulable phosphor sheet of the present invention, the cassette containing the stimulable phosphor sheet is transported into the erasure device, the cassette cover is opened and the erasure light is irradiated for erasing the phosphor sheet, so that the following advantages are derived.

Thus, with the use of the present erasure device, the stimulable phosphor sheet may be erased easily and automatically before the sheet is used, so that, contrary to the conventional practice, there is no necessity for circulatingly transporting the sheets, resulting in savings in the transport time and labor and elimination of the flaws or contamination on the sheet surface otherwise caused during transport of the sheets.

When the erasure device of the present invention is used for primary erasure, there is no necessity for providing an erasure unit within the image reading system, so that the device may be reduced in size.

According to the erasure device of the present invention, the primary or secondary erasure is performed directly before the stimulable phosphor sheets are employed for recording, so that, despite prolonged storage time in the cassettes, the energies stored in the sheets due to exposure to environmental radiations during such storage time can be erased completely, with the result that an optimum image information may be obtained upon reusing the sheets for recording.

What we claim is:

1. A cassette for a stimulable phosphor sheet comprising a casing accomomodating a stimulable phosphor sheet therein and a cover pivotally mounted to said casing for opening and closure, wherein light reflecting means are provided therein for reflecting or diffusing the light introduced from outside the cassette for irradiation on an image recording region of said stimulable phosphor sheet.

2. A cassette according to claim 1 wherein said light reflecting means comprises a light reflecting surface on the inner surface of the cover for reflecting or diffusing the light.

3. A cassette for a stimulable phosphor sheet comprising a casing accommodating the stimulable phosphor sheet and a cover mounted to said casing for opening and closure, wherein light transmitting means are provided therein for transmitting the light introduced from outside the cassette for irradiation on an image recording region of said stimulable phosphor sheet.

4. A cassette according to claim 3 wherein said light transmitting means are provided therein in register with said image recording region of said stimulable phosphor sheet accommodated in the cassette, said light transmitting means comprising a light transmitting member having an inlet for external light, with light barrier means being provided for intercepting the light otherwise introduced into said inlet for external light.

5. A cassette for a stimulable phosphor sheet comprising a casing accommodating the stimulable phosphor sheet and a cover mounted to said casing for opening and closing, wherein a light source and light transmitting means are provided therein, said light transmitting means transmitting the light from said light source for irradiation on the image recording region on said stimulable phosphor sheet.

6. A cassette for a stimulable phosphor sheet according to claim 5 wherein said light transmitting means include a light transmitting member provided in register with the image recording region of said stimulable phosphor sheet and having an inlet for light emitted by said light source.

7. A cassette for a stimulable phosphor sheet comprising a casing for the stimulable phosphor sheet and a cover mounted to said casing for opening and closing, wherein light emitting means are provided at least in register with the image recording region of said stimulable phosphor sheet accommodated therein.

8. A cassette according to claim 7 wherein said light emitting means are provided on the inner side of said casing.

9. A cassette according to claim 7 wherein said light emitting means are provided on the inner side of said cover.

10. A cassette according to any one of claims 7 to 9 wherein said light emitting means are light emitting diodes.

11. A device for erasing radiation energies stored in a stimulable phosphor sheet by irradiating an erasure light on said sheet, comprising a housing, means provided in said housing for opening a cassette placed at a predetermined position within said housing, said cassette accommodating the stimulable phosphor sheet to be erased, and a light source device provided in said housing for irradiating said erasure light on said stimulable phosphor sheet within said cassette which is in the opened state, said cassette including light reflecting means provided therein for reflecting or diffusing at least a portion of said erasure light.

12. A device according to claim 11 comprising cassette transport means for transporting said cassette to said predetermined position in said housing from outside said housing and also out of said housing from said predetermined position.

13. A device according to claims 11 or 12 wherein only one cassette can be contained in said housing, said one cassette being transported into the device and then transported therefrom after erasure.

14. A device according to claim 11 or 12 wherein a plurality of cassettes can be contained in said housing and adapted to be erased separately or simultaneously.

15. A device for erasing radiation energies stored in a stimulable phosphor sheet by irradiating an erasure light on said sheet wherein erasure is performed directly before the stimulable phosphor sheet is employed for signal recording, comprising a housing, means provided in said housing for opening a cassette placed at a predetermined position within said housing, said cassette accomodating the stimulable phosphor sheet to be erased, and a light source device provided in said housing for irradiating said erasure light on said stimulable phosphor sheet within said cassette which is in the opened state.

* * * * *